Feb. 5, 1935.  R. P. LANSING  1,990,038
TRANSMISSION
Filed Feb. 29, 1932
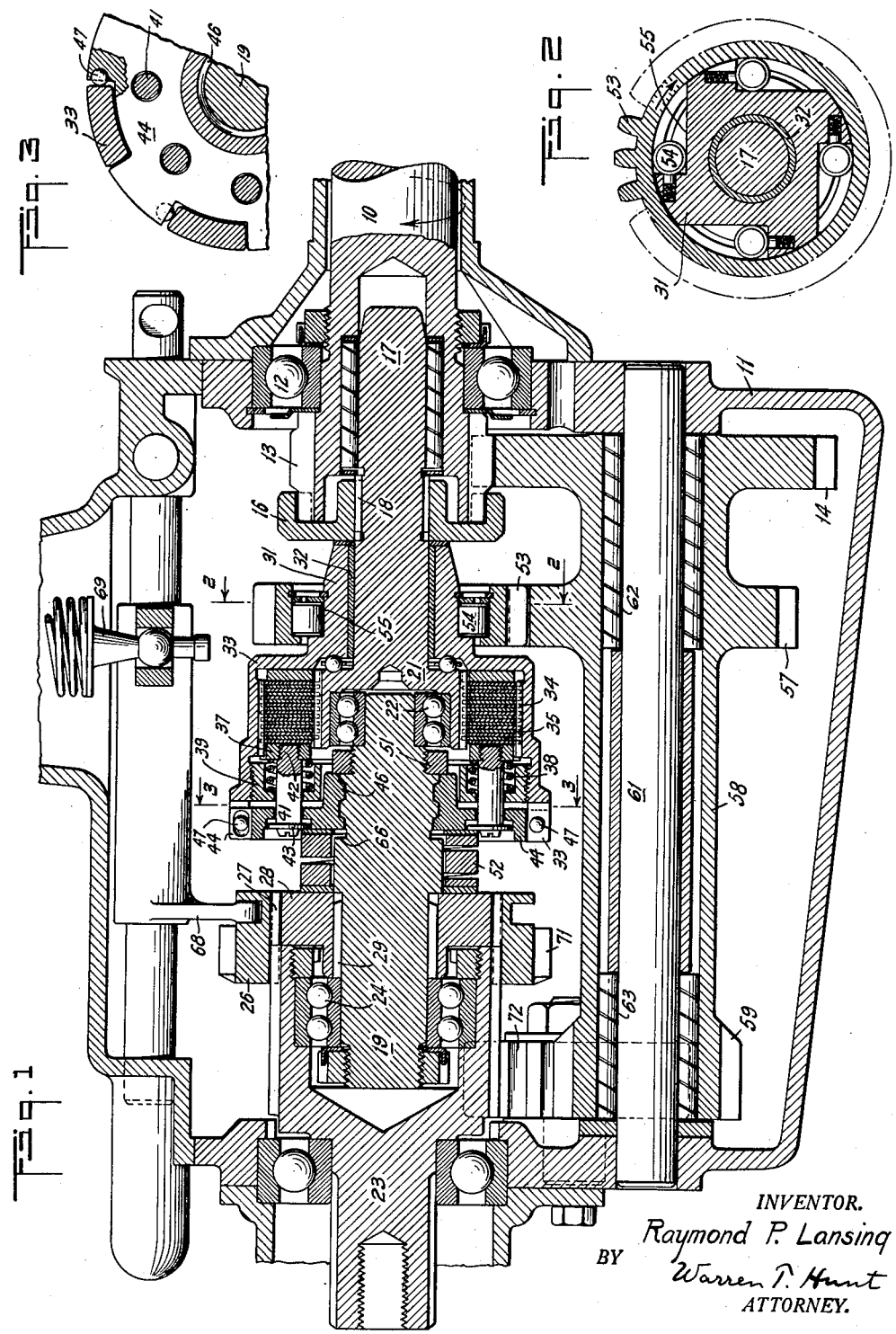
INVENTOR.
Raymond P. Lansing
BY
Warren T. Hunt
ATTORNEY.

Patented Feb. 5, 1935

1,990,038

UNITED STATES PATENT OFFICE 1,990,038

TRANSMISSION

Raymond P. Lansing, Montclair, N. J., assignor, by mesne assignments, to Eclipse Aviation Corporation, East Orange, N. J., a corporation of New Jersey Application February 29, 1932, Serial No. 595,922

18 Claims. (Cl. 74—337)

This invention relates to transmission mechanisms, and more particularly to an automatic variable speed transmission mechanism.

An object of the invention is to provide an automatic variable speed mechanism in which the speed or gear changes are made in accordance with the load or torque on the driven shaft.

Another object of the invention is to provide an automatic variable speed transmission mechanism in which the speed or gear changes are made with greater rapidity than is usual in devices of this nature.

Another object of the invention is to provide a variable speed transmission mechanism in which the high speed drive is normally engaged by a clutch having a predetermined slipping value that is quickly disengaged when the load on the driven shaft exceeds the predetermined amount.

Another object of the invention is to provide an automatic variable speed transmission mechanism in which there is substantially no delayed action between the high speed engagement and the low speed engagement.

Another object of the invention is to provide an automatic variable speed transmission mechanism in which the driving and driven shafts are normally in engagement by a clutch having a predetermined slipping value that is positively released by torque reaction at a predetermined load on the driven shaft.

Other objects of the invention will be apparent from the following description, in connection with which a preferred embodiment of the invention has been shown in the accompanying drawing, in which:

Fig. 1 is a longitudinal section through a transmission constructed according to the invention;

Fig. 2 is a sectional view taken on line 2—2 of Fig. 1; and,

Fig. 3 is a sectional fragmental view taken on lines 3—3 of Fig. 1.

Referring to the drawing, 10 is the engine shaft rotatably mounted in transmission housing 11 by bearing 12 and to which is secured a pinion 13 in mesh with a gear 14 and having a driving relation with coupling 16 secured to driving shaft 17 by splines 18. A driven shaft 19 is preferably piloted within the drum 21 of driving shaft 17 by a bearing 22, the opposite end of driven shaft 19 being supported in a second driven or propelling shaft 23 by bearing 24. Driven shafts 19 and 23 are normally connected by a clutch member 26 slidably splined upon shaft 23 and engaging teeth 27 of member 28 that has a splined connection with driven shaft 19 at 29.

Clutch housing 31 is rotatably mounted upon driving shaft 17 by bearing 32 and preferably has an annular portion 33 constituting a clutch compartment which is in overlapping relation with driven shaft 19. A series of plates or discs 34 and 35 are preferably alternately splined to housing 33 and drum 21 respectively. Discs 34 and 35, being slidable within the housing 33, are adapted to be forced into driving relation by a pressure plate 37 urged into contacting relation with the discs by springs 38 that coact between an adjusting nut 39 and pressure plate 37 for forcing the discs together to transmit torque between the drum 21 and the housing 33 at some predetermined value, which may be varied by adjusting the position of nut 39. Studs 41 are secured to pressure plate 37 by any desired means, such as threaded portions 42, and are provided with heads 43 normally having a slight spaced relation with nut 44 which has a threaded connection with driven shaft 19 at 46 and a slidable toothed connection with housing 33, as shown in Fig. 3, balls 47 being preferably interposed between the coacting teeth to reduce friction under the driving load.

A nut 51 is secured to driving shaft 19 in a predetermined position which acts as a stop to limit movement of nut 44 toward the clutch and prevent its contacting with adjusting nut 39 when it is urged toward the clutch by spring 52. The hub portion 31 of the clutch housing is connected to gear 53 by an overrunning clutch including rollers 54 mounted in recesses 55 and adapted to drivably connect the gear 53 with the clutch housing when the gear 53 is rotated in a clockwise direction at a greater speed than housing 31 but to permit housing 31 to overrun gear 53 in a clockwise direction, the action of the overrunning clutch being well known in the art and needing no further description. Gear 53 is in constant mesh with gear 57 preferably formed on a sleeve 58 which carries also the gear 14 and gear 59, the sleeve being mounted to rotate on shaft 61 by bearings 62 and 63.

In the operation of the transmission, assuming that the parts are in the position as shown in Fig. 1, rotation of shaft 10 is transmitted to shaft 17 by coupling 16 through the discs 34 and 35 to clutch housing 33. The clutch housing in turn transmits movement to nut 44 and to shaft 19 through the threaded portion 46, while shaft 19 is directly coupled to shaft 23 by slidable member 26.

Motion is also transmitted to gear 53 by the gears 13, 14, and 57, but as gear 53 is driven at a lower speed than engine shaft 10, rollers 54 will be in the position shown in Fig. 2 and housing 31 will overrun gear 53, and the shaft 23 will be rotated at engine shaft speed by the friction discs 34 and 35.

If for any reason the load on driven shafts 23 and 19 should exceed the predetermined load that the clutch is capable of transmitting, clutch housing 33 will be rotated relative to shaft 19 and the threaded portion 46 will cause nut 44 to move toward the left against the force of the heavy compression spring 52. A slight movement of nut 44 in an axial direction away from the clutch nut 39 will cause it to engage the head 43 of the stud 41 and move the pressure plate 37 out of contact with the friction discs. As soon as pressure is relieved from the clutch discs, housing 33 will be driven at a lower speed and increased torque by gear 53, whereupon the nut 44 will move to its extreme left position against shoulder 66.

A decrease in the driven load will cause nut 44 to be forced into a reverse direction, and as soon as the head of 43 is released by nut 44, the friction discs will be abruptly forced into contact and the drive again taken at engine shaft speed, the movement of 44 toward the clutch being arrested by nut 51 for preventing contact of nut 44 with the adjusting nut 39 in the high speed position.

If it is desired to reverse the car, yoke 68 is moved toward the left by shift lever 69 until member 26 passes out of mesh with 27 to a neutral position and is pushed still further upon the splined driven shaft 23 until teeth 71 engage the teeth of idler gear 72 that is in constant mesh with gear 59, whereupon shaft 23 is driven in the reverse direction through the gear train comprising pinion 13, gears 14, 59, 72 and 71.

It will be readily understood from the above description that an automatic variable speed transmission mechanism has been provided in which, under normal operating conditions, the driven shafts are connected together by a clutch in which the frictional elements are forced into contact by springs that may be adjusted to permit the clutch to slip at some predetermined value, and that at rotation above the capacity of the clutch the driven shaft is connected to a lower speed gear train without any delayed action occurring between the gear changes. The delayed action in the present transmission mechanism is substantially eliminated by the relationship of the torque actuated nut 44 which may move slightly without affecting the clutch capacity and thereafter acts on the clutch pressure plate to quickly release the clutch.

While a preferred embodiment of the invention is illustrated and described, it is understood that this showing and description are illustrative only and that the invention is not limited to the form shown and described, or otherwise, except by the terms of the following claims.

What is claimed is:

1. In a transmission mechanism, a driving shaft, a driven shaft, a housing, a friction clutch therein having friction members for connecting the shafts, resilient means coacting with the housing to engage the clutch, a member operatively connecting the housing and driven shaft, a spring urging the member toward the clutch, means for limiting axial movement of the member toward the friction members, said member being movable in the opposite direction by torque reaction, and means operated by the member to release the clutch when the load on the driven shaft is increased beyond a predetermined value.

2. In a transmission mechanism, a driving shaft, a driven shaft, a housing, a friction clutch therein for connecting the shafts, resilient means coacting with the housing to engage the clutch, a member operatively connecting the housing and driven shaft, said member being movable by torque reaction, means engaged by the member after a predetermined movement thereof to release the clutch when the load on the driven shaft is increased beyond a predetermined value, and means for driving the housing at a lower speed than the driving shaft when the clutch is released.

3. In a transmission mechanism, a driving shaft, a driven shaft, a housing, a friction clutch therein for connecting the shafts, resilient means coacting with the housing to engage the clutch, a member operatively connecting the housing and driven shaft, said member being movable by torque reaction, means engaged by the member after a predetermined movement thereof to release the clutch when the load on the driven shaft is increased beyond a predetermined value, and means including an overrunning clutch for driving the housing when the friction clutch is released.

4. In a transmission mechanism, a driving shaft, a driven shaft, a housing, a friction clutch therein for connecting the shafts, resilient means coacting with the housing to engage the clutch, a member operatively connecting the housing and driven shaft, said member being movable by torque reaction, means engaged by the member after a predetermined movement thereof to release the clutch when the load on the driven shaft is increased beyond a predetermined value, and means for connecting the shafts around the clutch for reversing the rotation of the driven shaft.

5. In a transmission mechanism, a driving shaft, a driven shaft aligned therewith, a concentric housing rotatably mounted on the driving shaft, friction members secured to the housing and driving shaft respectively, resilient means coacting with the housing normally pressing the friction members into driving relation, a nut having a threaded engagement with the driven shaft and a slidable driving engagement with the housing, and means engaged by the nut upon slight movement thereof for relieving the spring pressure on the friction members at a predetermined driven shaft load.

6. In a transmission mechanism, a driving shaft, a driven shaft aligned therewith, a concentric housing rotatably mounted on the driving shaft, friction members secured to the housing and driving shaft respectively, resilient means coacting with the housing normally pressing the friction members into driving relation, a nut having a threaded engagement with the driven shaft and a slidable driving engagement with the housing, means engaged by the nut upon slight movement thereof for relieving the spring pressure on the friction members at a predetermined driven shaft load, and gear means adapted to drive the housing when the driven shaft speed relative to the driving shaft speed is reduced to a predetermined ratio.

7. In a transmission mechanism, a driving shaft, a driven shaft aligned therewith, a concentric housing rotatably mounted on the driving shaft, friction members secured to the housing and driving shaft respectively, resilient means coacting with the housing normally pressing the friction members into driving relation, a nut having a threaded engagement with the driving shaft and a slidable driving engagement with the housing, means engaged by the nut upon slight movement thereof for relieving the spring pressure on the friction members at a predetermined driven shaft load, and means for connecting the housing to the driving shaft, including a gear train having an overrunning clutch in series therewith.

8. In a transmission mechanism, a driving shaft, a driven shaft, a friction clutch having spring pressed friction members normally connecting the shafts adapted to slip at a predetermined driven shaft load, movable means coacting with the friction members for disengaging the clutch, said clutch having a portion thereof in constant operative driving connection with the driven shaft, and said driving connection of the clutch with the driven shaft including a nut threaded on the driven shaft and normally out of contact with the clutch disengaging means and axially movable by torque reaction a slight distance relative to the clutch and adapted to contact the clutch disengaging means to release the clutch only after a slight movement of the nut.

9. A transmission mechanism comprising a driving shaft, a clutch housing rotatable thereon, a driven shaft, coacting friction discs connected respectively to the housing and driven shaft, a backing plate in the housing, a pressure plate adapted to contact the discs, springs coacting between the backing plate and pressure plate for engaging the clutch, a nut having a threaded engagement with the driven shaft and a slidable driving connection with the housing, members operatively secured to the pressure plate and adapted to be moved by the nut to release the clutch, a spring urging the nut toward the clutch, and a shoulder on the driven shaft limiting the movement of the nut toward the clutch.

10. A transmission mechanism comprising a driving shaft, a clutch housing rotatable thereon, a driven shaft, coacting friction discs connected respectively to the housing and driven shaft, a backing plate in the housing, a pressure plate adapted to contact the discs, springs coacting between the backing plate and pressure plate for engaging the clutch, a nut having a threaded engagement with the driven shaft and a slidable driving connection with the housing, members operatively secured to the pressure plate and adapted to be moved by the nut to release the clutch, a spring urging the nut toward the clutch, a shoulder on the driven shaft limiting the movement of the nut toward the clutch, and a gear train including an overrunning clutch connecting the driving shaft with the housing.

11. A transmission mechanism comprising a driving shaft, a driven shaft, a friction clutch for connecting the shafts including springs and friction members, a nut having a threaded connection with the driven shaft and a sliding driving connection with the clutch, a spring urging said nut toward the clutch, said nut having means cooperative with the clutch to compress the clutch springs to release the clutch only after a slight axial movement of the nut, said nut being movable by torque reaction to disengage the clutch, and gear means for connecting the shafts when the clutch is released.

12. A transmission mechanism comprising a driving shaft, a driven shaft, a friction clutch for connecting the shafts including springs and friction members, a nut having a threaded connection with the driven shaft and a sliding driving connection with the clutch, a spring urging said nut toward the clutch, said nut having means cooperative with the clutch to compress the clutch springs to release the clutch only after a slight axial movement of the nut, said nut being movable by torque reaction to disengage the clutch, gear means for connecting the shafts when the clutch is released, and stops for limiting the movement of the nut in both directions.

13. In an automatic transmission, a driving shaft, a driven shaft, a friction clutch having spring pressed engageable and disengageable members for connecting the shafts, gear means for connecting the shafts when the clutch is disengaged, and means associated with the members and adapted to separate the same for disengaging the clutch, including a nut movable by torque reaction, said nut being movable a limited distance without affecting clutch engagement and thereafter movable by increased torque reaction to disengage the clutch.

14. In an automatic transmission, a driving shaft, a driven shaft, a friction clutch having its hub connected to the driving shaft, a clutch housing driven by the hub, a pressure member within the housing having headed studs projecting axially of the housing, a nut having a slidable driving connection with the housing and a threaded connection with the driven shaft, said nut having a portion thereof adapted to engage the heads of said studs after a predetermined axial movement of the nut, a spring for opposing movement of said nut by the load resistance of the driven shaft, and a gear train for connecting the clutch housing to the driving shaft when the clutch is released by movement of the nut.

15. In an automatic transmission, a driving shaft, a driven shaft, a friction clutch for connecting the shafts having a housing, means responsive to torque reaction for disengaging the clutch, the housing being connected to the driven shaft through the disengaging means, and a gear train including an overrunning clutch for connecting the housing to the driving shaft when the friction clutch is disengaged.

16. In an automatic transmission, a driving shaft, a driven shaft, a friction clutch for connecting the shafts having a housing, means responsive to torque reaction for disengaging the clutch, the housing being connected to the driven shaft through the disengaging means, and a gear train including an overrunning clutch for connecting the housing to the driving shaft when the friction clutch is disengaged, the gear of the train having the overrunning clutch being mounted upon the clutch housing and adapted to drive the same in one direction through the overrunning clutch.

17. In a transmission mechanism, a driving shaft, a driven shaft, a friction clutch having a spring and friction members normally connecting the shafts and adapted to slip at a predetermined driven shaft load, means carried by the clutch and movable axially thereof by torque reaction, and means on the clutch for compressing said spring to release the clutch having a shoulder normally spaced from said axially movable means but engageable therewith to compress the spring and release the clutch after a predetermined movement of the axially movable means.

18. In a transmission mechanism, a driving shaft, a driven shaft, a spring pressed friction clutch having a housing and a hub member, said hub member being connected to one of said shafts, a member movable with respect to the housing by torque reaction and drivably connecting the housing to the other shaft, a plate for relieving spring pressure on the clutch, and headed means secured to the plate arranged to be engaged by the movable member after a predetermined movement thereof to relieve the spring pressure and release the clutch.

RAYMOND P. LANSING.